United States Patent
Ishii

(10) Patent No.: US 8,149,339 B2
(45) Date of Patent: Apr. 3, 2012

(54) BROADCAST RECEIVING APPARATUS AND REPRODUCTION PROCESSING METHOD

(75) Inventor: Michito Ishii, Kanagawa (JP)

(73) Assignee: Sony Corporation (JP)

( * ) Notice: Subject to any disclaimer, the term of this patent is extended or adjusted under 35 U.S.C. 154(b) by 311 days.

(21) Appl. No.: 12/451,725

(22) PCT Filed: May 8, 2008

(86) PCT No.: PCT/JP2008/058896
§ 371 (c)(1),
(2), (4) Date: Nov. 24, 2009

(87) PCT Pub. No.: WO2008/149647
PCT Pub. Date: Dec. 11, 2008

(65) Prior Publication Data
US 2010/0128183 A1 May 27, 2010

(30) Foreign Application Priority Data
May 30, 2007 (JP) .................................. 2007-143599

(51) Int. Cl.
*H04N 5/50* (2006.01)
*H04N 5/455* (2006.01)
(52) U.S. Cl. ......... 348/731; 348/473; 348/726; 348/738
(58) Field of Classification Search .......... 348/725–726, 348/731, 738, 553–555, 563–570, 705–706, 348/473, 734, 461, 465, 468, 474; 725/32, 725/34–35, 38, 40, 50, 58, 131, 134, 139, 725/151–152; *H04N 5/50, 5/455*
See application file for complete search history.

(56) References Cited

U.S. PATENT DOCUMENTS
6,593,973 B1 * 7/2003 Sullivan et al. ............... 348/584
(Continued)

FOREIGN PATENT DOCUMENTS
JP 9-135394 A 5/1997
(Continued)

OTHER PUBLICATIONS
Supplementary European Search Report EP 08752757, dated Jun. 1, 2010.

*Primary Examiner* — Trang U Tran
(74) *Attorney, Agent, or Firm* — Lerner, David, Littenberg, Krumholz & Mentlik, LLP

(57) ABSTRACT

In switching a channel or in switching an external input, a reduction in a psychological strain on a user is offered. An image generating unit 22 generates image data indicating a lapse of time on the basis of time information received from a control unit 30 and supplies it to a combining unit 21. The combining unit 21 combines image data stored in a storage unit 25 and the image data indicating the time information from the image generating unit 22 to generate video data and supplies the video data to a video switching unit 16. The video switching unit 16 selects video data from a video decoder 14, the video data from the combining unit 21, or video data from a determination unit 24 on the basis of the control of the control unit 30 and outputs it to the display unit 18. For example, when a user switches a channel by operating an operating unit 31, muting is performed, the video data from the combining unit 21 is selected, and video indicating a lapse of time is displayed on the display unit 18.

8 Claims, 5 Drawing Sheets

U.S. PATENT DOCUMENTS

| | | |
|---|---|---|
| 6,710,816 B1 | 3/2004 | Minami |
| 7,227,583 B2 * | 6/2007 | Sin .............................. 348/570 |
| 7,884,883 B2 * | 2/2011 | Kondo et al. ................ 348/563 |
| 2007/0211172 A1 | 9/2007 | Kondo et al. |

FOREIGN PATENT DOCUMENTS

| | | |
|---|---|---|
| JP | 2000-041197 A | 2/2000 |
| JP | 2001-007722 A | 1/2001 |
| JP | 2001157131 A | 6/2001 |
| JP | 2002-142167 A | 5/2002 |
| JP | 2005-295028 A | 10/2005 |
| JP | 2006-050553 A | 2/2006 |

* cited by examiner

FIG. 4

| CHANNEL AFTER SWITCHING | CHANNEL BEFORE SWITCHING | TOTAL TIME OF MUTING (sec.) |
|---|---|---|
| AA | AB | XXX |
|  | AC | YYY |
|  | ⋮ | ⋮ |
|  | ZZ | ZZZ |
| AB | AA | XXA |
|  | AC | YYB |
|  | ⋮ | ⋮ |
|  | ZZ | ZZC |
| ⋮ | ⋮ | ⋮ |
| ZZ | AA | XAX |
|  | AB | YBY |
|  | ⋮ | ⋮ |
|  | ZY | ZBZ |

…

BROADCAST RECEIVING APPARATUS AND REPRODUCTION PROCESSING METHOD

CROSS-REFERENCES TO RELATED APPLICATIONS

The present application is a national phase entry under 35 U.S.C. §371 of International Application No. PCT/JP2008/058896 filed May 8, 2008, published on Dec. 11, 2008 as WO 2008/149647 A1, which claims priority from Japanese Patent Application No. JP 2007-143599 filed in the Japanese Patent Office on May 30, 2007.

TECHNICAL FIELD

The present invention relates to a broadcast receiving apparatus and a reproduction processing method that allow viewing of digital television broadcasting.

BACKGROUND ART

In recent years, television receivers allowing viewing of digital television broadcasting, such as digital terrestrial broadcasting, broadcasting satellite (BS) digital television broadcasting, and communication satellite (CS) digital television broadcasting, have become increasingly popular. In a broadcast receiving apparatus, such as that television receiver, in switching a channel or switching a device connected using an external input terminal, typically, a blank time of approximately two or three seconds is present.

This is because reproduction processing performed from a channel switching operation to displaying of video complies with the specifications defined in integrated services digital broadcasting terrestrial (ISDB-T), advanced television services committee (ATSC), or digital video broadcasting (DVB).

For such specifications, for example, when a user switches a channel, data that identifies the channel from a radio wave sent from a broadcast facility is acquired in a broadcast receiving apparatus, and video data corresponding to the desired channel is acquired on the basis of the acquired channel identification data. At this time, it is necessary for the broadcast receiving apparatus to acquire various data elements as the channel identification data. However, because the data elements are output from the broadcast facility in different periods, acquiring necessary various data elements and identifying the desired channel is time-consuming.

Accordingly, to shorten a blank time, for example, it is necessary to change the specifications of digital television broadcasting so as to more efficiently acquire channel identification data.

And, these days, the functionality of integrated circuits (ICs) and applications used in an output stage in a broadcast receiving apparatus is extended and they can process various kinds of processing. Therefore, for example, in switching a device connected using various external input terminals, a blank time tends to be longer.

Incidentally, during a blank time, muting that displays only a black image is commonly performed. However, in the case where a black image is displayed during a blank time, a user does not know when video is displayed, so a problem arises in which the user feels the length of a time up to the displaying of the video is longer than in traditional analog television broadcasting.

Thus, to solve this problem, methods of displaying a different image or video during muting have been proposed previously. For example, Japanese Unexamined Patent Application Publication No. 2000-41197 describes a method of smoothly switching a channel by displaying a previously stored image, such as a still picture, during a blank time from channel switching to video displaying.

However, with the method described in the above-described Japanese Unexamined Patent Application Publication No. 2000-41197, only a different image or video is simply displayed. Therefore, a user does not know how much time has elapsed since channel switching or how long it would take to display video since channel switching. This leads to a problem of placing a psychological strain on the user.

DISCLOSURE OF INVENTION

Accordingly, it is an object of the present invention to provide a broadcast receiving apparatus and a reproduction processing method that are capable of reducing a psychological strain on a user in switching a channel or in switching an external input.

To solve the above-described problems, a first invention is a broadcast receiving apparatus characterized by including a tuner unit configured to tune to a modulated signal of a frequency corresponding to a predetermined channel from a radio wave in digital television broadcasting, demodulate the modulated signal, and output a transport stream, a separation unit configured to separate the transport stream into video data and added data, a decoder configured to decode the video data and output first video data being decoded, a timer configured to count a time using channel switching as a trigger, a control unit configured to extract current-time information contained in the added data, add the current-time information and a count value of the timer together, and calculate time information, an image generating unit configured to generate second video data indicating a lapse of time from the current time on the basis of the time information, and a switching unit configured to select the first video data or the second video data and output it, wherein the switching unit is controlled such that, in the case where a channel is switched, muting is performed and during the muting the second video data is output.

And, a second invention is a broadcast receiving apparatus characterized by including a tuner unit configured to tune to a modulated signal of a frequency corresponding to a predetermined channel from a radio wave in digital television broadcasting, demodulate the modulated signal, and output a transport stream, a separation unit configured to separate the transport stream into video data and added data, a decoder configured to decode the video data, output first video data being decoded, and also output start-time information indicating a start time of the decoding, a timer configured to count a time using reception of the start-time information as a trigger, a control unit configured to add the start-time information and a count value of the timer together and calculate elapsed-time information indicating an elapsed time of the decoding, an image generating unit configured to generate second video data indicating a lapse of time from the start time of the decoding on the basis of the elapsed-time information, and a switching unit configured to select the first video data or the second video data and output it, wherein the switching unit is controlled such that, in the case where a channel is switched, muting is performed and during the muting the second video data is output.

And, a third invention is a broadcast receiving apparatus characterized by including a tuner unit configured to tune to a modulated signal of a frequency corresponding to a predetermined channel from a radio wave in digital television broadcasting, demodulate the modulated signal, and output a transport stream, a separation unit configured to separate the transport stream into video data and added data, a decoder configured to decode the video data and output first video data being decoded, a timer configured to count a time using channel switching as a trigger, a storage unit configured to store a channel switching database in which total-time information indicating a total time of muting corresponding to a channel switching pattern, a control unit configured to calculate remaining-time information indicating a remaining time for the muting acquired by subtraction of a count value of the timer from the total-time information acquired by reference to the channel switching database, an image generating unit configured to generate second video data indicating a lapse of time up to completion of the muting on the basis of the remaining-time information, and a switching unit configured to select the first video data or the second video data and output it, wherein the switching unit is controlled such that, in the case where a channel is switched, muting is performed and during the muting the second video data is output.

And, a fourth invention is a reproduction processing method characterized by including a tuning step of tuning to a modulated signal of a frequency corresponding to a predetermined channel from a radio wave in digital television broadcasting, demodulating the modulated signal, and outputting a transport stream, a separation step of separating the transport stream into video data and added data, a decoding step of decoding the video data and outputting first video data being decoded, a step of counting a time by use of a timer using channel switching as a trigger, a step of extracting current-time information contained in the added data, adding the current-time information and a count value of the timer together, and calculating time information, an image generating step of generating second video data indicating a lapse of time from the current time on the basis of the time information, and a switching step of selecting the first video data or the second video data and outputting it, wherein control is performed such that, in the case where a channel is switched, muting is performed and during the muting the second video data is output.

And, a fifth invention is a reproduction processing method characterized by including a tuning step of tuning to a modulated signal of a frequency corresponding to a predetermined channel from a radio wave in digital television broadcasting, demodulating the modulated signal, and outputting a transport stream, a separation step of separating the transport stream into video data and added data, a decoding step of decoding the video data, outputting first video data being decoded, and also outputting start-time information indicating a start time of the decoding, a step of counting a time by use of a timer using reception of the start-time information as a trigger, a step of adding the start-time information and a count value of the timer together and calculating elapsed-time information indicating an elapsed time of the decoding, an image generating step of generating second video data indicating a lapse of time from the start time of the decoding on the basis of the elapsed-time information, and a switching step of selecting the first video data or the second video data and outputting it, wherein the switching unit is controlled such that, in the case where a channel is switched, muting is performed and during the muting the second video data is output.

And, a sixth invention is a reproduction processing method characterized by including a tuning step of tuning to a modulated signal of a frequency corresponding to a predetermined channel from a radio wave in digital television broadcasting, demodulating the modulated signal, and outputting a transport stream, a separation step of separating the transport stream into video data and added data, a decoding step of decoding the video data and output first video data being decoded, a step of counting a time by use of a timer using channel switching as a trigger, a storage step of storing a channel switching database in which total-time information indicating a total time of muting corresponding to a channel switching pattern, a step of calculating remaining-time information indicating a remaining time for the muting acquired by subtraction of a count value of the timer from the total-time information acquired by reference to the channel switching database, an image generating step of generating second video data indicating a lapse of time up to completion of the muting on the basis of the remaining-time information, and a switching step of selecting the first video data or the second video data and outputting it, wherein the switching unit is controlled such that, in the case where a channel is switched, muting is performed and during the muting the second video data is output.

As described above, with the first and fourth inventions, a time is counted by a timer using channel switching as a trigger, current-time information contained in added data is extracted, the current-time information and a count value of the timer are added together, time information is calculated, second video data indicating a lapse of time from the current time is generated on the basis of the time information, and in the case where a channel is switched, muting is performed and during the muting, the second video data is selected from the first video data and the second video data and is output. Therefore, during the muting, video indicating a lapse of time from the current time is output.

And, with the second and fifth inventions, a timer is counted by a timer using reception of start-time information output in decoding as a trigger, the start-time information and a count value of the timer are added together, elapsed-time information indicating an elapsed time of the decoding is calculated, second video data indicating a lapse of time from the start time of the decoding is generated on the basis of the elapsed-time information, and in the case of a channel is switched, muting is performed and during the muting, the second video data is selected from the first video data and the second video data and is output. Therefore, during the muting, video indicating a lapse of time from the start of the decoding is output.

And, with the third and sixth inventions, a timer is counted by a timer using channel switching as a trigger, a channel switching database in which total-time information indicating a total time of muting corresponding to a channel switching pattern is described is stored, remaining-time information indicating a remaining time for muting acquired by subtraction of a count value of the timer from the total-time information acquired by reference to the channel switching database is calculated, second video data indicating a lapse of time up to completion of the muting is generated on the basis of the remaining-time information, and in the case of a channel is switched, muting is performed and during the muting, the second video data is selected from the first video data and the second video data and is output. Therefore, during the muting, video indicating a lapse of time up to the completion of the muting is output.

BRIEF DESCRIPTION OF DRAWINGS

FIG. 4 is a schematic diagram that illustrates an example of a channel switching database.

BEST MODE FOR CARRYING OUT THE INVENTION

Figure 1:
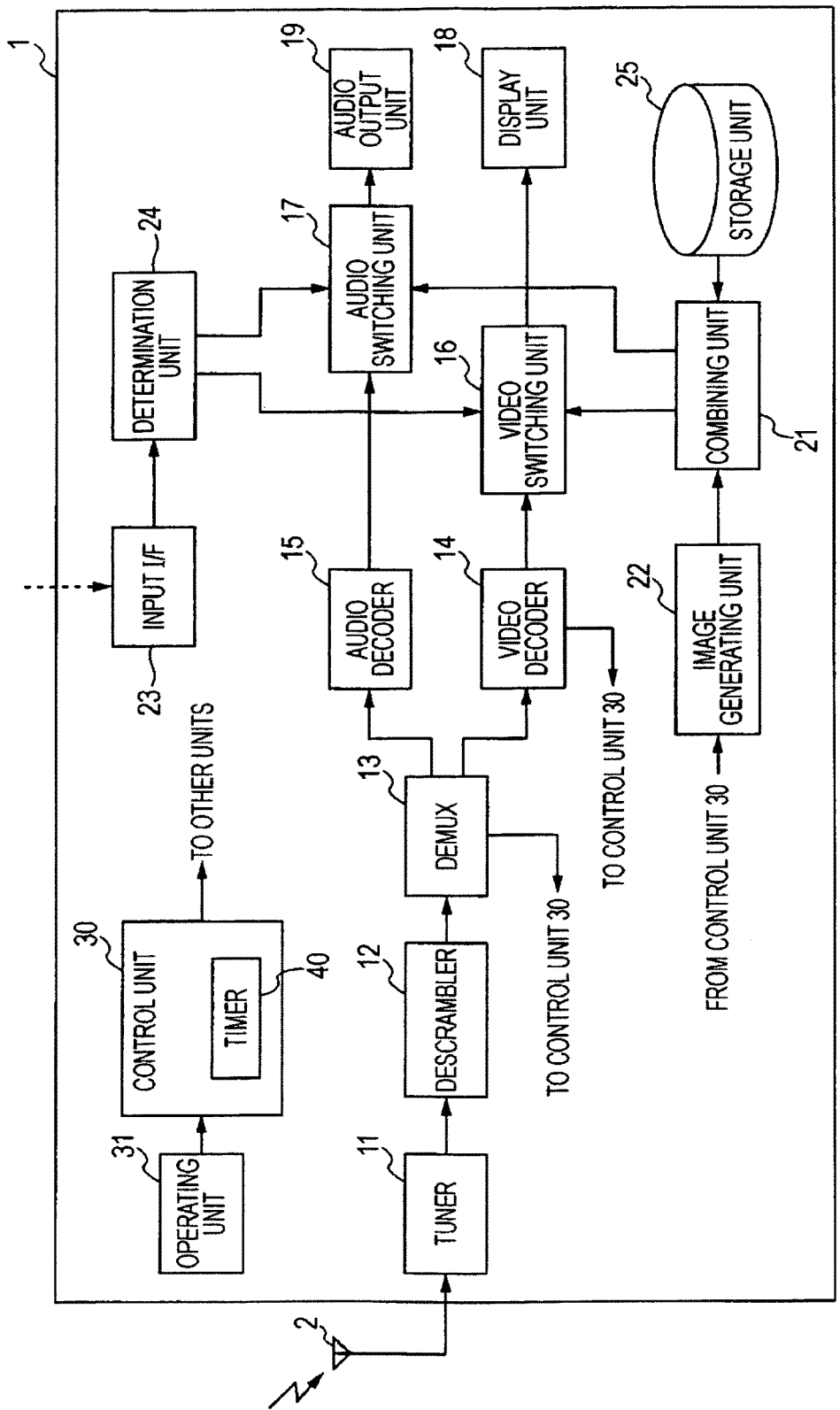
FIG. 1 is a block diagram that illustrates an example of a broadcast receiving apparatus according to an embodiment of the present invention.

An embodiment of the present invention is described below with reference to the drawings. With the embodiment of the present invention, during a blank time occurring in switching a channel or in switching an external input, as muting, an image or audio indicating a current time, a processing elapsed time, or a remaining time up to the completion of muting is displayed or output.

First, to facilitate the understanding of the embodiment of the present invention, data sent from an external broadcast facility is schematically described. In an external facility, for example, video, audio, and data are subjected to coding with the moving picture experts group-2 (MPEG-2) standard. In accordance with the specifications of the MPEG-2 systems, video data, audio data, and added data which is added to those data are formed into packets for each channel and data type, time-division multiplexed, and a series of packets called a transport stream (TS) is generated.

The generated transport stream (hereinafter referred to as TS as needed) made up of video data, audio data, and added data are subjected to scrambling using a scrambling key to allow only a specific user to view it. The scrambled TS is subjected to predetermined modulating defined by the specifications of corresponding digital television broadcasting and transmitted.

It is noted that, in digital satellite television broadcasting, such as BS digital television broadcasting, a TS generated in the above-described way and a TS generated in a similar way from another broadcast facility are multiplexed and transmitted to a single transponder. And, in digital satellite television broadcasting, TSs from broadcast facilities are transmitted using a plurality of transponders.

A TS is a stream of continuous TS packets. A TS packet is made up of a TS header and a payload and/or an adaptation field. A TS header of a TS header can be made up of, for example, a synchronization byte for use in detecting the head of the TS packet, an error indication that indicates the presence or absence of a bit error in the packet, a unit start indication that indicates the start of a new packetized elementary stream (PES) packet, a priority that indicates the degree of importance of the packet, and a packet identification (PID) that indicates the property of the packet. An adaptation field is one that can indicate information regarding data of a payload.

A PID indicates the property of a packet using a 13-bit value and has a value that varies depending on the type of data stored in a payload. The PID is used in filtering a necessary TS packet.

In a payload of a TS packet, one formed into a packet from video and audio streams of a plurality of channels can be stored. And, in addition to video and audio streams, data having a section form can also be stored. Data having a section form can be made up of, for example, service information (SI) in which information on a channel or a program is described and program sequence information, which is called program specific information (PSI), in which information required to acquire information on video and audio that form program information specified from a TS is described. Examples of the program sequence information can include a table, such as a program map table (PMT), a program association table (PAT), a time and date table (TDT), and an event information table (EIT).

A PMT is a table for use in identifying a TS packet that transmits video, audio, and data streams in each channel. A PMT exists for each channel and specifies the PID of each of the streams forming the channel and the type of the stream. A PID of a PMT itself is specified by a PAT, which is described below.

A PAT is a table for use in identifying a TS packet that transmits a PMT of each channel. A single PAT exists in a TS, and in the TS, a service ID existing in the TS and a PID of a PMT of the service are described.

A TDT is a table for use in transmitting the current date and time information. It is noted that, in BS digital television broadcasting, a time offset table (TOT) which can also transmit a time offset value in summer time is transmitted instead of a TDT.

An EIT is a table in which information on a program, such as a title, broadcasting date and time, and the details of the content of a program, is described. The EIT is classified into an EIT [p/f] and EIT [schedule]. An EIT [p/f] is one in which program information about a program being currently broadcast and a program to be broadcast next are described. An EIT [schedule] is one in which program information in a predetermined period, for example, up to one week in advance, is described. It is noted that, in the following, the description is provided with EITs [p/f] and EITs [schedule] being referred to collectively as EITs.

Additionally, a payload of a TS packet can store data having a section form in which information other than program sequence information is described. Specifically, for example, it can be a table required when pay broadcasting is viewed, such as an entitlement control message (ECM) and an entitlement management message (EMM).

An ECM is a table for use in transmitting a scrambling key for use in descrambling. An identification of a work key and information indicating forced ON/OFF of the scrambling function of a decoder are also transmitted. An EMM is a table for use in transmitting a work key being a key for use in encrypting ECM data. Contract information, such as the type and the term of a contract of a subscriber to pay broadcasting, is also transmitted.

A configuration of an example of a broadcast receiving apparatus 1 according to the embodiment of the present invention is described with reference to FIG. 1. As illustrated in FIG. 1, the broadcast receiving apparatus 1 includes a tuner 11, a descrambler 12, a demultiplexer (Demux) 13, a video decoder 14, an audio decoder 15, a video switching unit 16, an audio switching unit 17, a display unit 18, an audio output unit 19, a combining unit 21, an image generating unit 22, an input interface (I/F) 23, a determination unit 24, a storage unit 25, a control unit 30, and an operating unit 31.

The tuner 11 receives a radio wave in digital television broadcasting transmitted from a broadcast facility, using an externally connected antenna 2. The tuner 11 performs predetermined signal processing, such as demodulation and error correction, on the received radio wave in digital television broadcasting and outputs a TS (transport stream) to the descrambler 12.

The descrambler 12 retrieves an ECM and an EMM from the supplied TS and performs descrambling, by which scrambling is cleared, using a scrambling key and a work key contained in the ECM and the EMM. The descrambled TS is supplied to the demultiplexer 13.

The demultiplexer 13 performs filtering based on a PID value stored in the header portion of the TS packet, retrieves necessary video data, audio data, and added data from the multiplexed TS, supplies the video data to the video decoder 14, and also supplies the audio data to the audio decoder 15. And, the demultiplexer 13 supplies, to the control unit 30, a TDT or TOT, and EIT contained in the added data extracted from the TS.

The video decoder 14 decodes the video data and supplies the decoded video data to the video switching unit 16. And, the video decoder 14 supplies start-time information indicating the start time of the decoding to the control unit 30, which is described below. The audio decoder 15 decodes the audio data and supplies the decoded audio data to the audio switching unit 17.

The image generating unit 22 generates image data indicating time information on the basis of various kinds of time information supplied from the control unit 30, which is described below, and supplies it to the combining unit 21. The storage unit 25 can be made of a storage medium, such as a hard disc drive (HDD) or nonvolatile memory, for example, and stores predetermined image data in advance. The storage unit 25 supplies the image data stored in the storage medium to the combining unit 21 in response to a request from the combining unit 21, which is described below. And, the storage unit 25 stores a channel switching database, which is described below.

The combining unit 21 can combine image data previously stored in the storage unit 25 and image data indicating time information supplied from the image generating unit 22 and generates video data to be displayed in muting, for example. The generated video data is supplied to the video switching unit 16.

The input I/F 23 controls communications with an externally connected device in accordance with a predetermined protocol. The input I/F 23 receives video data and audio data from the connected external device and supplies them to the determination unit 24. As a terminal used in the input I/F 23, a high definition multimedia interface (HDMI) terminal, a composite terminal, and a component terminal can be used, for example.

The determination unit 24 determines the resolution, color, and baseband format of the video data received from the input I/F 23 and also determines the sampling rate and format of the audio data. The determination unit 24 supplies the video data to the video switching unit 16 and the audio data to the audio switching unit 17.

The video switching unit 16 selects the video data supplied from the video decoder 14, the video data supplied from the combining unit 21, or the video data supplied from the determination unit 24 on the basis of the control of the control unit 30, which is described below, and outputs it to the display unit 18. The display unit 18 displays it. As the display unit 18, for example, a cathode ray tube (CRT) or a liquid crystal display (LCD) can be used. The audio switching unit 17 selects the audio data supplied from the audio decoder 15, the audio data supplied from the combining unit 21, or the audio data supplied from the determination unit 24 on the basis of the control of the control unit 30 and outputs it to the audio output unit 19.

The operating unit 31 can be made of a remote control commander, for example. An operation of a predetermined provided operating element, such as a key, by a user outputs operating-element information corresponding to the operation, and it is supplied to the control unit 30. For example, when a user tunes to a channel, tuning information is output.

The control unit 30 controls each of the other units using a random-access memory (RAM), which is not illustrated, as a work memory in accordance with a program previously stored in a read-only memory (ROM), which is not illustrated. The control unit 30 includes a timer 40. The timer 40 can count a time using, as a trigger, the operating-element information output from the operating unit 31 when a channel is switched or when an external input is switched or the start-time information output from the video decoder 14 when decoding starts, for example.

And, the control unit 30 controls the video switching unit 16 and the audio switching unit 17 such that video data to be output to the display unit 18 and audio data to be output to the audio output unit 19 are selected in accordance with an operation of the operating unit 31 by a user. Specifically, when tuning is performed by an operation of the operating unit 31 by a user, the control unit 30 performs control, as muting, the video switching unit 16 and the audio switching unit 17 such that video data and audio data supplied from the combining unit 21 are output. When decoding is completed, the control unit 30 performs control such that video data supplied from the video decoder 14 and audio data supplied from the audio decoder 15 are output. And, when an externally connected device is selected by an operation of the operating unit 31 by a user, the control unit 30 performs control such that video data and audio data supplied from the determination unit 24 are output.

The control unit 30 supplies, to the image generating unit 22, various kinds of time information based on information supplied from the demultiplexer 13 and the video decoder 14. For example, the control unit 30 generates time information on the basis of current-time information indicating the current time and date described in a TDT or TOT and EIT supplied from the demultiplexer 13 and a count value of the timer 40 and supplies it to the image generating unit 22. And, the control unit 30 calculates an elapsed time on the basis of the start-time information on decoding supplied from the video decoder 14 and the count value of the timer 40 and supplies elapsed-time information indicating the elapsed time to the image generating unit 22. Additionally, the control unit 30 refers to the channel switching database stored in the storage unit 25, acquires total-time information on muting, and calculates the remaining time for the muting on the basis of the acquired total-time information and the count value of the timer 40. Then, the remaining-time information indicating the calculated remaining time is supplied to the image generating unit 22.

Next, displaying in muting is described. According to the embodiment of the present invention, as muting occurring in the case where a channel is switched or in the case where an external input is switched, time information regarding the current time, the processing elapsed time, or the remaining time is displayed.

Figure 2A:
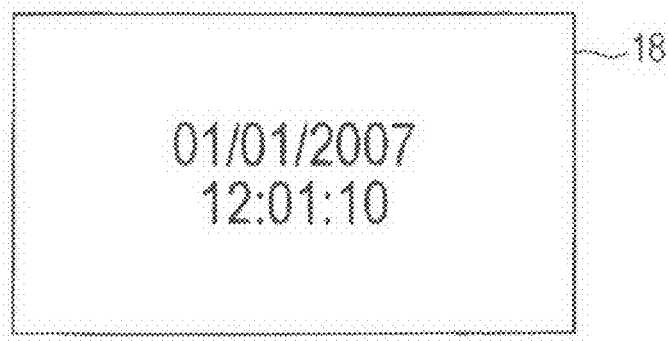
FIGS. 2A, 2B, and 2C are schematic diagrams for use in describing an example of displaying of time information.

For example, as illustrated in FIG. 2A, an image of time information generated by the image generating unit 22 is displayed as it is at a predetermined position in a display region of the display unit 18. Alternatively, for example, as illustrated in FIG. 2B, an image indicating time information generated by the image generating unit 22 is displayed so as to be moved within the display region of the display unit 18 every predetermined time.

Figure 2B:
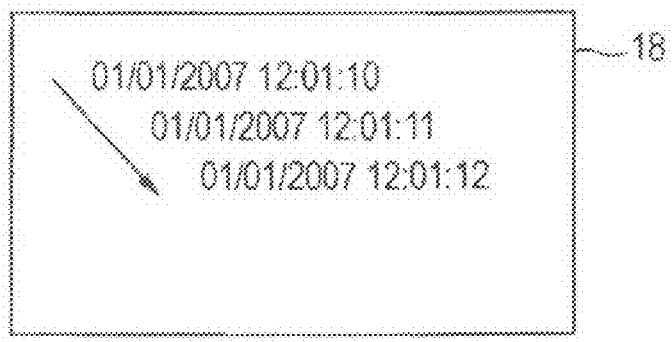
Figure 2C:

In the examples illustrated in FIGS. 2A and 2B, an image indicating time information is displayed with respect to a black image. However, the present embodiment is not limited to these examples. For example, as illustrated in FIG. 2C, a combined image in which an image of time information generated by the image generating unit 22 and an image selected by a user from an image displayed before channel switching and an image stored in the storage unit 25 are combined can also be displayed on the display unit 18.

Examples of the time information displayed during muting can include the current time, elapsed time on decoding, and remaining time up to video displaying. To display the current time, the control unit 30 extracts the current-time information from a TDT or TOT. And, the timer 40 starts time counting using, as a trigger, reception of operating-element information output from the operating unit 31 in channel switching. Then, the control unit 30 calculates time information in which the count value of the timer 40 is added to the current-time information and supplies it to the image generating unit 22.

Figure 3A:
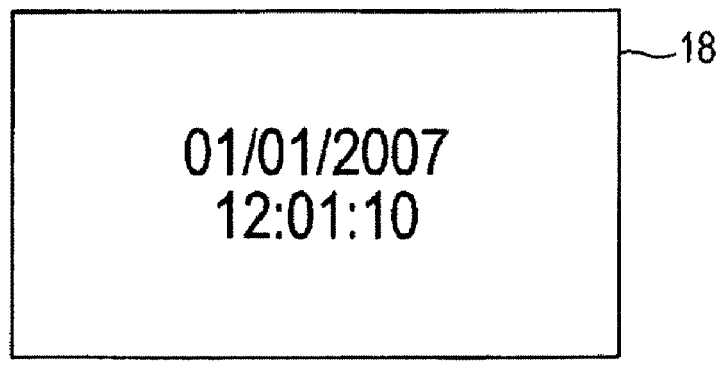
FIGS. 3A, 3B, and 3C are schematic diagrams for use in describing an example of displaying of time information.

The image generating unit 22 generates image data indicating the time every predetermined elapsed time, for example, every 1 second, on the basis of the time information supplied from the control unit 30 and supplies it to the combining unit 21. The combining unit 21 generates video data indicating a lapse of time on the basis of the image data indicating the time every predetermined elapsed time. In such a way, during muting, as illustrated in FIG. 3A, video indicating a lapse of time from the current time can be displayed on the display unit 18.

To display a processing elapsed time, the control unit 30 acquires start-time information on decoding supplied from the video decoder 14. And, the timer 40 starts time counting using, as a trigger, reception of the start-time information. Then, the control unit 30 calculates an elapsed time of decoding in which the count value of the timer 40 is added to the start-time information and supplies elapsed-time information indicating the elapsed time of decoding to the image generating unit 22.

Figure 3B:
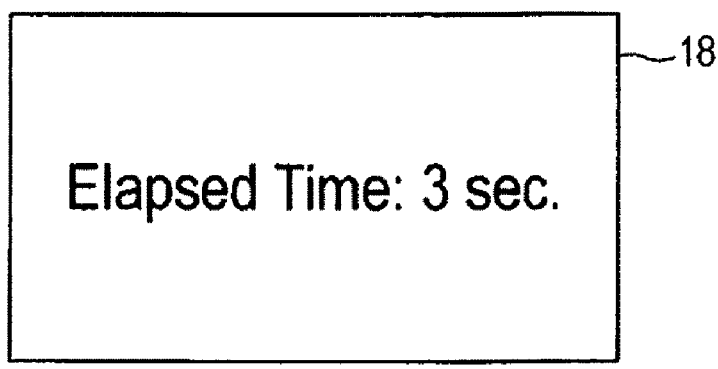

The image generating unit 22 generates image data indicating the time every time a predetermined time elapses, for example, every 1 second, on the basis of the processing elapsed time information supplied from the control unit 30 and supplies it to the combining unit 21. The combining unit 21 generates video data indicating a lapse of time on the basis of the image data indicating the time every time a predetermined time elapses. In such a way, during muting, as illustrated in FIG. 3B, video indicating a lapse of time of decoding can be displayed on the display unit 18.

To display a remaining time for muting, the remaining time for muting can be acquired by subtraction of an elapsed time counting from the start of the muting from the total time of the muting.

Here, a method of acquiring the total time of muting is described. For example, in the case of satellite broadcasting, such as BS digital television broadcasting, TSs are transmitted using a plurality of transponders; if different transponders are used in TSs corresponding to services before and after channel switching, it is necessary to change a transponder for reception. Because of this, depending on the pattern of channel switching, a time required to change a transponder for reception may be present. Accordingly, the total time of muting in the case where a channel is switched may differ in accordance with channels before and after switching.

Thus, according to the embodiment of the present invention, a channel switching database in which a total time of muting corresponding to a switching pattern when a channel is switched is described is prepared in advance. To display a remaining time for muting in the case where a channel is switched, the total time of muting is acquired by reference to the channel switching database.

In the channel switching database, for example, as illustrated in FIG. 4, "Channel After Switching," "Channel Before Switching," and "Total Time of Muting" are described. A channel after switching is a channel switched by an operation of the operating unit 31 by a user. A channel before switching is a channel before being switched. A total time of muting is a remaining time required for muting when a channel before switching is switched to a channel after switching.

In the channel switching database, all channel switching patterns are described. For example, it shows that, when a channel before switching is "AB" and a channel after switching is "AA," the total time of muting is "XXX" seconds.

Accordingly, to display the remaining time for muting, the control unit 30 refers to the channel switching database stored in the storage unit 25 and acquires the total-time information indicating the total time of the muting. And, the timer 40 starts time counting using, as a trigger, reception of operating-element information output from the operating unit 31 in channel switching, for example. Then, the control unit 30 calculates remaining-time information in which the count value of the timer 40 is subtracted from the total-time information and supplies it to the image generating unit 22.

The image generating unit 22 generates image data indicating the time every time a predetermined time elapses, for example, every 1 second, on the basis of the remaining-time information supplied from the control unit 30 and supplies it to the combining unit 21. The combining unit 21 generates video data indicating a lapse of time on the basis of the image data indicating the time every time a predetermined time elapses. In such a way, during muting, as illustrated in FIG. 3C, video indicating a lapse of time of the remaining time for the muting can be displayed on the display unit 18.

Figure 3C:
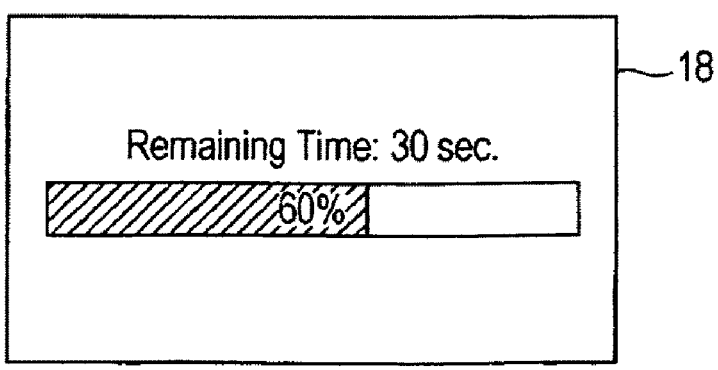

It is noted that, to display a remaining time for muting, for example, as illustrated in FIG. 3C, in addition to the indication of the remaining time, an indication of an elapsed time at present with respect to the remaining time using bar representation may also be provided to allow it to be visually identified.

To display a remaining time for muting in the case where an external input is switched, for example, the total time of the muting can be set in advance, and the remaining time can be calculated on the basis of the set total time. This is because it is assumed that a time required for processing when a device is selected from among a plurality of devices connected to the input I/F 23 is substantially the same even when any device is selected. Accordingly, the remaining time for muting can be calculated by subtraction of the count value of the timer 40 from the previously set total time.

Next, a flow of reproduction processing in tuning in a broadcast receiving apparatus according to the embodiment of the present invention is described with reference to the flowchart illustrated in FIG. 5. Here, the case where digital satellite television broadcasting is tuned to is described by way of example. And, with this example, the case where a remaining time is displayed in muting as time information is described. It is noted that the following processing is performed under the control of the control unit 30 unless otherwise specified.

When a user performs tuning by operating the operating unit 31 and an instruction to switch a channel is provided, a series of processing is started. In step S1, muting is started. In step S2, Circus Code is processed. In step S3, an appropriate transponder is tuned to by the tuner 11 on the basis of the Circus code, and demodulation is performed.

In step S4, by the demultiplexer 13, from a TS of the transponder being receiving, filtering is performed on the basis of a PID and a PAT is received. In step S5, filtering is performed on the basis of a PID of a PMT described in the PAT, and the PMT is received.

In step S6, an EMM is acquired by the demultiplexer 13 from the TS, and a work key is acquired from the EMM. And, an ECM is acquired by the demultiplexer 13 from the TS. In step S7, the ECM acquired in step S6 is decoded using the work key, and a scrambling key is acquired from the decoded ECM.

In step S8, descrambling is performed by the descrambler 12 using the scrambling key acquired in step S7. In step S9, decoding of video data is started by the video decoder 14.

In step S10, it is determined whether time information is to be displayed during muting. When it is determined that the time information is to be displayed, the processing proceeds to step S11. In step S11, a TDT or TOT is acquired from the TS by the demultiplexer 13. In step S12, current-time information described in the TDT or TOT is acquired.

In step S13, it is determined whether a remaining time for muting is to be displayed. When it is determined that the remaining time is to be displayed, the processing proceeds to step S14. In step S14, in accordance with channels before and after switching, the channel switching database is referred to, the total time of muting is acquired, and the remaining time for muting is calculated by subtraction of the count value of the timer 40 from the acquired total time.

Meanwhile, in step S13, when it is determined that the remaining time is not to be displayed, the processing proceeds to step S15.

In step S15, image data indicating the remaining time is generated by the image generating unit 22 on the basis of the remaining time for muting calculated in step S14 and the image data supplied from the storage unit 25. It is noted that when, in step S13, it is determined that the remaining time is not to be displayed image data indicating the current time is generated on the basis of the current-time information acquired in step S12 and the image data from the storage unit 25. In step S16, video data indicating a lapse of time is generated in the combining unit 21 on the basis of the image data of the remaining time generated in step S15 and displayed on the display unit 18.

In step S17, it is determined whether decoding performed by the video decoder 14 has been completed. When it is determined that the decoding has been completed, the processing proceeds to step S19. When it is determined that the decoding has not been completed, the processing returns to step S13.

Meanwhile, in step S10, when it is determined that the time information is not to be displayed, for example, a black image is displayed as muting and the processing proceeds to step S18. In step S18, it is determined whether decoding performed by the video decoder 14 has been completed. When it is determined that the decoding has been completed, the processing proceeds to step S19. When it is determined that the decoding has not been completed, the processing returns to step S10.

In step S19, the decoded video data is displayed on the display unit 18, and a series of processing ends.

Figure 5:
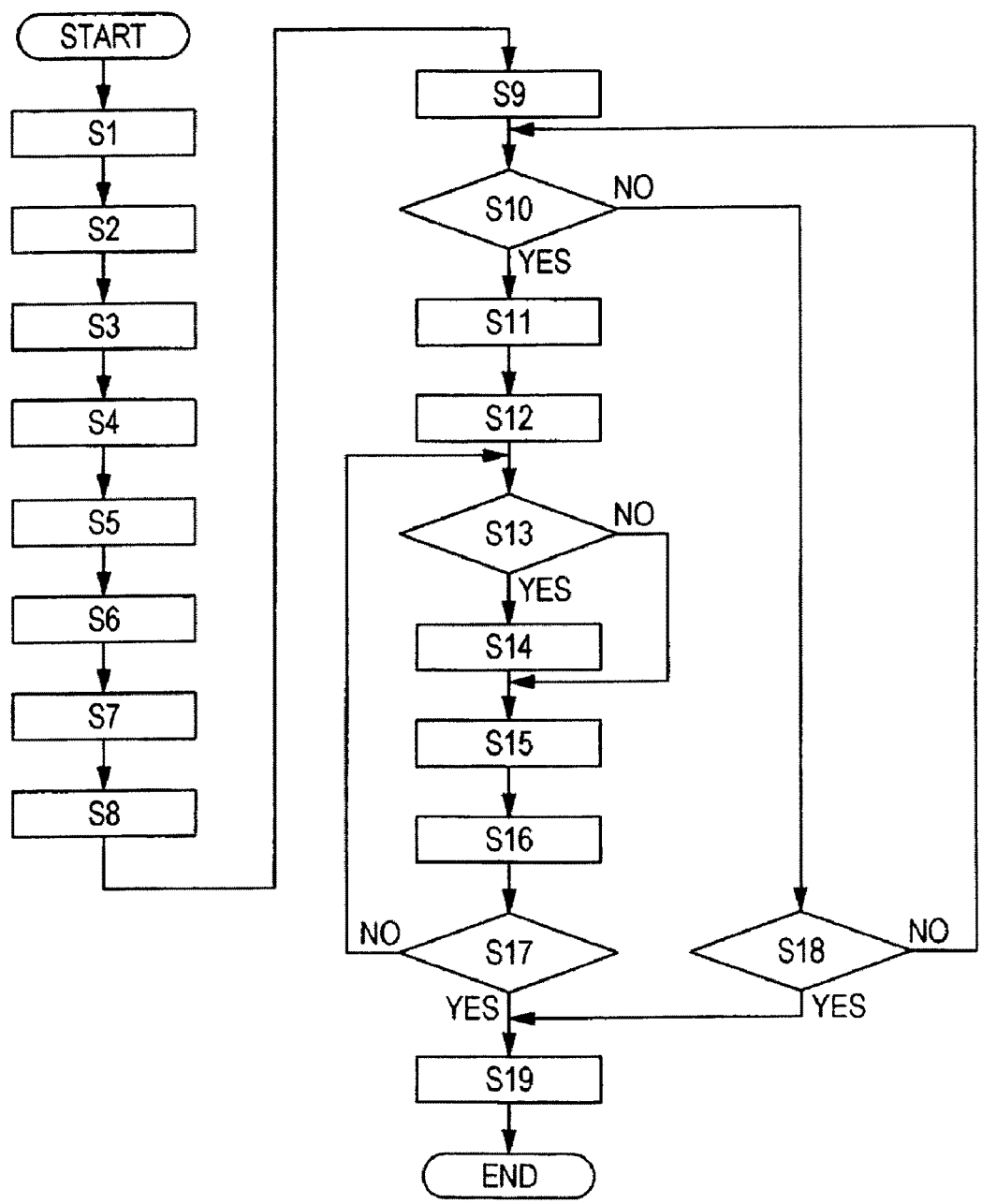
FIG. 5 is a flowchart that illustrates a flow of reproduction processing in tuning in a broadcast receiving apparatus.

With the flowchart illustrated in FIG. 5, a flow of tuning in the case where a remaining time for muting is displayed is described. For example, also in the case where an elapsed time from the start of decoding is displayed during muting, the elapsed time can be displayed by similar processing.

In this case, specifically, in step S13, it is determined whether an elapsed time from the start of decoding is to be displayed. When it is determined that the elapsed time is to be displayed, in step S14, the elapsed time of the decoding is calculated by the control unit 30 on the basis of the start-time information supplied from the video decoder 14. Then, in step S15, image data indicating the elapsed time of the decoding is generated on the basis of the calculated elapsed time and the image data supplied from the storage unit 25. Then, in step S16, video data indicating a lapse of time is generated by the combining unit 21.

It is noted that, in the foregoing, processing occurring in the case where digital satellite television broadcasting is tuned to is described. In the case where digital terrestrial television broadcasting is tuned to, because no satellite transponder exists, the processing of tuning to a transponder in step S3 is omitted.

And, in this example, the case where video data is output is described. However, also in the case where audio data is output, the audio data can be output by a similar way.

As described above, according to the embodiment of the present invention, during muting, time information, such as an elapsed time from channel switching or a time up to displaying video, is displayed. Therefore, a psychological strain on a user can be reduced.

In the foregoing, the embodiment of the present invention is described. However, the present invention is not limited to the above-described embodiment of the present invention, and various modifications and applications can be made without departing from the scope of the present invention. For example, in the above description, as image data used in video data displayed during muting, image data previously stored in the storage unit 25 is used. However, the present invention is not limited to this case. For example, image data corresponding to a user's taste may be newly added on the storage unit 25, and the added image data may be used.

With the present invention, during muting, video data indicating the current time, elapsed time of decoding, and a lapse of time of the remaining time up to the completion of the muting or the like can be output. Therefore, there is an advantage of reducing a psychological strain on a user.

EXPLANATION OF REFERENCE

1 BROADCAST RECEIVING APPARATUS
2 ANTENNA
11 TUNER
12 DESCRAMBLER
13 DEMULTIPLEXER
14 VIDEO DECODER
15 AUDIO DECODER
16 VIDEO SWITCHING UNIT
17 AUDIO SWITCHING UNIT
18 DISPLAY UNIT
19 AUDIO OUTPUT UNIT
21 GENERATING UNIT
22 IMAGE GENERATING UNIT
23 INPUT I/F
24 DETERMINATION UNIT
25 STORAGE UNIT
30 CONTROL UNIT
31 OPERATING UNIT
40 TIMER
S1 PERFORM MUTING
S2 PROCESS CIRCUS
S3 PERFORM TUNING AND DEMODULATING
S4 ACQUIRE PAT
S5 ACQUIRE PMT
S6 ACQUIRE ECM
S7 ACQUIRE SCRAMBLING KEY
S8 PERFORM DESCRAMBLING
S9 START DECODING
S10 DISPLAY TIME INFORMATION?
S11 ACQUIRE TDT/TOT
S12 ACQUIRE CURRENT-TIME INFORMATION

S13 DISPLAY REMAINING TIME?
S14 CALCULATE REMAINING TIME
S15 GENERATE IMAGE
S16 DISPLAY VIDEO
S17 DECODING COMPLETED?
S18 DECODING COMPLETED?
S19 DISPLAY VIDEO

The invention claimed is:

1. A broadcast receiving apparatus characterized by comprising:
    a tuner unit configured to tune to a modulated signal of a frequency corresponding to a predetermined channel from a radio wave in digital television broadcasting, demodulate the modulated signal, and output a transport stream;
    a separation unit configured to separate the transport stream into video data and added data;
    a decoder configured to decode the video data and output first video data being decoded;
    a timer configured to count a time using channel switching as a trigger;
    a control unit configured to extract current-time information contained in the added data, add the current-time information and a count value of the timer together, and calculate time information;
    an image generating unit configured to generate second video data indicating a lapse of time from the current time on the basis of the time information; and
    a switching unit configured to select the first video data or the second video data and output it,
    wherein the switching unit is controlled such that, in the case where a channel is switched, muting is performed and during the muting the second video data is output.

2. The broadcast receiving apparatus according to claim 1, characterized in that it further comprises:
    a storage unit configured to store image data; and
    a combining unit configured to combine the image data stored in the storage unit with the second video data.

3. The broadcast receiving apparatus according to claim 1, characterized in that it further comprises an input interface connected to an external device, the input interface being configured to receive third video data output from the external device, and
    the switching unit is configured to select the first video data, the second video data, or the third video data and output it.

4. A broadcast receiving apparatus characterized by comprising:
    a tuner unit configured to tune to a modulated signal of a frequency corresponding to a predetermined channel from a radio wave in digital television broadcasting, demodulate the modulated signal, and output a transport stream;
    a separation unit configured to separate the transport stream into video data and added data;
    a decoder configured to decode the video data, output first video data being decoded, and also output start-time information indicating a start time of the decoding;
    a timer configured to count a time using reception of the start-time information as a trigger;
    a control unit configured to add the start-time information and a count value of the timer together and calculate elapsed-time information indicating an elapsed time of the decoding;
    an image generating unit configured to generate second video data indicating a lapse of time from the start time of the decoding on the basis of the elapsed-time information; and
    a switching unit configured to select the first video data or the second video data and output it,
    wherein the switching unit is controlled such that, in the case where a channel is switched, muting is performed and during the muting the second video data is output.

5. A broadcast receiving apparatus characterized by comprising:
    a tuner unit configured to tune to a modulated signal of a frequency corresponding to a predetermined channel from a radio wave in digital television broadcasting, demodulate the modulated signal, and output a transport stream;
    a separation unit configured to separate the transport stream into video data and added data;
    a decoder configured to decode the video data and output first video data being decoded;
    a timer configured to count a time using channel switching as a trigger;
    a storage unit configured to store a channel switching database in which total-time information indicating a total time of muting corresponding to a channel switching pattern;
    a control unit configured to calculate remaining-time information indicating a remaining time for the muting acquired by subtraction of a count value of the timer from the total-time information acquired by reference to the channel switching database;
    an image generating unit configured to generate second video data indicating a lapse of time up to completion of the muting on the basis of the remaining-time information; and
    a switching unit configured to select the first video data or the second video data and output it,
    wherein the switching unit is controlled such that, in the case where a channel is switched, muting is performed and during the muting the second video data is output.

6. A reproduction processing method characterized by comprising:
    a tuning step of tuning to a modulated signal of a frequency corresponding to a predetermined channel from a radio wave in digital television broadcasting, demodulating the modulated signal, and outputting a transport stream;
    a separation step of separating the transport stream into video data and added data;
    a decoding step of decoding the video data and outputting first video data being decoded;
    a step of counting a time by use of a timer using channel switching as a trigger;
    a step of extracting current-time information contained in the added data, adding the current-time information and a count value of the timer together, and calculating time information;
    an image generating step of generating second video data indicating a lapse of time from the current time on the basis of the time information; and
    a switching step of selecting the first video data or the second video data and outputting it,
    wherein control is performed such that, in the case where a channel is switched, muting is performed and during the muting the second video data is output.

7. A reproduction processing method characterized by comprising:

a tuning step of tuning to a modulated signal of a frequency corresponding to a predetermined channel from a radio wave in digital television broadcasting, demodulating the modulated signal, and outputting a transport stream;

a separation step of separating the transport stream into video data and added data;

a decoding step of decoding the video data, outputting first video data being decoded, and also outputting start-time information indicating a start time of the decoding;

a step of counting a time by use of a timer using reception of the start-time information as a trigger;

a step of adding the start-time information and a count value of the timer together and calculating elapsed-time information indicating an elapsed time of the decoding;

an image generating step of generating second video data indicating a lapse of time from the start time of the decoding on the basis of the elapsed-time information; and a switching step of selecting the first video data or the second video data and outputting it, wherein control is performed such that, in the case where a channel is switched, muting is performed and during the muting the second video data is output.

8. A reproduction processing method characterized by comprising:

a tuning step of tuning to a modulated signal of a frequency corresponding to a predetermined channel from a radio wave in digital television broadcasting, demodulating the modulated signal, and outputting a transport stream;

a separation step of separating the transport stream into video data and added data;

a decoding step of decoding the video data and output first video data being decoded;

a step of counting a time by use of a timer using channel switching as a trigger;

a storage step of storing a channel switching database in which total-time information indicating a total time of muting corresponding to a channel switching pattern;

a step of calculating remaining-time information indicating a remaining time for the muting acquired by subtraction of a count value of the timer from the total-time information acquired by reference to the channel switching database;

an image generating step of generating second video data indicating a lapse of time up to completion of the muting on the basis of the remaining-time information; and a switching step of selecting the first video data or the second video data and outputting it, wherein control is performed such that, in the case where a channel is switched, muting is performed and during the muting the second video data is output.

* * * * *